United States Patent
Fiesel et al.

(10) Patent No.: US 9,784,308 B2
(45) Date of Patent: Oct. 10, 2017

(54) ROLLING BEARING

(71) Applicant: Liebherr-Components Biberach GmbH, Biberach an der Riss (DE)

(72) Inventors: Thomas Fiesel, Ehingen-Risstissen (DE); Herbert Sauter, Biberach an der Riss (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 0 days.

(21) Appl. No.: 15/030,358

(22) PCT Filed: Oct. 17, 2014

(86) PCT No.: PCT/EP2014/002806
§ 371 (c)(1),
(2) Date: Apr. 18, 2016

(87) PCT Pub. No.: WO2015/055317
PCT Pub. Date: Apr. 23, 2015

(65) Prior Publication Data
US 2016/0245333 A1  Aug. 25, 2016

(30) Foreign Application Priority Data
Oct. 18, 2013  (DE) .................... 20 2013 009 246 U

(51) Int. Cl.
*F16C 19/49* (2006.01)
*F16C 19/18* (2006.01)
(Continued)

(52) U.S. Cl.
CPC .............. *F16C 19/18* (2013.01); *F16C 19/30* (2013.01); *F16C 19/381* (2013.01); *F16C 19/49* (2013.01);
(Continued)

(58) Field of Classification Search
CPC ..................................................... F16C 19/381
See application file for complete search history.

(56) References Cited

U.S. PATENT DOCUMENTS

| 4,126,361 A | 11/1978 | Bottner et al. |
| 4,573,811 A * | 3/1986 | Andree ................. F16C 19/181 384/622 |

(Continued)

FOREIGN PATENT DOCUMENTS

| DE | 21549 A1 | 7/1961 |
| DE | 1179052 B | 10/1964 |

(Continued)

OTHER PUBLICATIONS

Machine translation of WO 2008058729.*
(Continued)

*Primary Examiner* — Thomas R. Hannon
(74) *Attorney, Agent, or Firm* — McCoy Russell LLP

(57) ABSTRACT

A rolling bearing, in particular a center-free large rolling bearing, having two concentric ball races with one ball race comprising a groove open toward the other ball race and the other ball race comprising a scraper ring engaging into the groove, wherein the scraper ring is supported at the groove in the axial direction of the rolling bearing by at least two axial bearings arranged at oppositely disposed scraper ring front sides and wherein the scraper ring is supported in the radial direction by at least one radial bearing which is arranged on a scraper ring jacket surface. The scraper ring is supported in the axial direction at the groove by a third axial bearing, wherein two axial bearings are arranged at the same side of the scraper ring at separate raceways offset from one another in the axial direction of the rolling bearing.

11 Claims, 3 Drawing Sheets

(51) Int. Cl.
  *F16C 35/06* (2006.01)
  *F16C 19/30* (2006.01)
  *F16C 19/38* (2006.01)
  *F16C 33/58* (2006.01)
(52) U.S. Cl.
  CPC .......... *F16C 33/585* (2013.01); *F16C 35/061* (2013.01); *F16C 2240/80* (2013.01); *F16C 2300/14* (2013.01); *F16C 2326/00* (2013.01)

(56) References Cited

U.S. PATENT DOCUMENTS

| | | | |
|---|---|---|---|
| 4,906,112 A | | 3/1990 | Gobel et al. |
| 6,523,708 B2 * | | 2/2003 | Weckbecker ............ B66C 23/36 212/181 |
| 9,188,155 B2 * | | 11/2015 | Weckbecker ............ B66C 23/84 |

FOREIGN PATENT DOCUMENTS

| | | |
|---|---|---|
| DE | 1202617 A | 10/1965 |
| DE | 2647588 A1 | 4/1978 |
| DE | 3733190 A1 | 4/1989 |
| DE | 3905986 C1 | 7/1990 |
| DE | 102006054453 A1 | 5/2008 |
| DE | WO 2008058729 A1 * | 5/2008 ........... F16C 19/381 |
| DE | 202007018480 U1 | 10/2008 |
| DE | 102011083824 A1 | 4/2013 |
| EP | 0158015 A1 | 10/1985 |
| EP | 2092204 B1 | 8/2002 |
| FR | 86195 E | 12/1965 |
| WO | 2008088213 A2 | 7/2008 |

OTHER PUBLICATIONS

"Drahtwlzlager," Rothe Erde GmbH, Sonderdruck aus der Technischen Rundschau, Bern-Schweiz, No. 18, p. 5, Table 2, Available as Early as Jan. 1957, 4 pages. (Submitted with Machine Translation).

ISA European Patent Office, International Search Report Issued in Application No. PCT/EP2014/002806, Apr. 14, 2015, WIPO, 4 pages.

* cited by examiner

ROLLING BEARING

CROSS REFERENCE TO RELATED APPLICATIONS

The present application is a U.S. National Phase of International Patent Application Serial No. PCT/EP2014/002806, entitled "Rolling-Element Bearing," filed on Oct. 17, 2014, which claims priority to German Utility Model Patent Application No. 20 2013 009 246.7, filed on Oct. 18, 2013, the entire contents of each of which are hereby incorporated by reference in their entirety for all purposes.

TECHNICAL FIELD

The present invention relates to a rolling bearing, in particular to a center-free large rolling bearing, having two concentric ball races of which the one ball race comprises a groove open toward the other ball race and the other ball race comprises a scraper ring engaging into the named groove, wherein the scraper ring is supported at the groove in the axial direction of the rolling bearing by at least two axial bearings which are arranged at oppositely disposed scraper ring front sides and wherein the scraper ring is supported in the radial direction by at least one radial bearing which is arranged on a scraper ring jacket surface.

BACKGROUND AND SUMMARY

With large rolling bearings for special applications, considerable bending moments and tilting forces sometimes act on the bearing rings which can lead to twisting and to an angular offset of the ball races with respect to one another such that premature wear occurs in the region of the ball races and of the roller bodies. Such large rolling bearings can have dimensions of a plurality of meters in diameter and can, for example, be used on cranes in order, for example, to rotatably support and to prop up the support mast of a ship crane or of a harbor crane, with here not only vertical forces having to be absorbed, but also bending moments or tilt loads. The twisting and tilting problems are in this respect further aggravated when the middle or center of the bearing has to be kept free to allow the component to be supported, for example the named crane support mast, to pass through the bearing or to be able to attach a rotary drive to the part which has to be passed through. The bearing rings of such a center-free large rolling bearing can in particular not be of any desired size in construction, in particular in the radial direction, for space reasons so that the achievable moments of inertia of an area of the ball races are limited.

A large rolling bearing of the initially named kind is shown, for example, in the document EP 2 092 204 B1, in accordance with which the scraper ring of the one ball race is to be clamped by two oppositely disposed axial bearings and two oppositely disposed radial bearings in the groove of the other ball race, wherein the named oppositely disposed axial bearings and radial bearings should prevent unwanted deformation of the scraper ring and should avoid a separation of the ball races in the radial direction. A similar large rolling bearing and its installation situation at the support mast of a ship crane is shown in the document WO 2008/088 213 A2. Whereas the named documents essentially deal with the problems of the separation of the radial bearings as a consequence of twisting of the ball races and endeavor to avoid a lifting of the radial bearings by the clamping of the scraper ring by oppositely disposed jacket surface sides, canting and twisting still occur in the region of the axial bearings.

The vertical crane loads and the corresponding reaction forces in the crane mast support typically still make up a large or considerable part of the rolling bearing load so that the lower axial bearing, which has to absorb the vertical crane loads, is typically configured in the form of a load-carrying cylinder rolling bearing whose cylinder rollers have a relatively large cylinder roller width to have a sufficiently large contact line and to keep surface pressures tolerable. On the other hand, such wide cylinder rolling bearings react critically to tilting or to inclinations of the raceways with respect to one another since here very quickly only a very small proportion of the cylinder rollers is actually bearing.

It is the underlying object of the present invention to provide an improved rolling bearing of the initially named kind which avoids disadvantages of the prior art and further develops it in an advantageous manner. A center-free large rolling bearing should in particular be provided which can absorb high axial loads without in so doing being susceptible to tilt loads and to inclinations of the raceways.

The named object is achieved in accordance with the invention by a rolling bearing having two concentric ball races, wherein a first ball race comprises a groove open toward a second ball race and the second ball race comprises a scraper ring engaging into the groove, wherein the scraper ring is supported at the groove in an axial direction of the rolling bearing by a first and a second axial bearing which are arranged at oppositely disposed front sides of the scraper ring and is supported in a radial direction of the rolling bearing by at least one radial bearing, wherein the scraper ring is supported at the groove in the axial direction by a third axial bearing, with the first and second axial bearings arranged at the front side of the scraper ring in raceways offset from one another in the axial direction.

It is therefore proposed to support the scraper ring with respect to the groove and thus to support the one ball race with respect to the other ball race by a third axial bearing in order also be able to absorb high axial forces with bearings of a narrower construction size and to be able to distribute them over different support points. In this respect, the two axial bearings arranged at the same scraper ring front side are not only transversely spaced apart from one another, but are also offset from one another in the axial direction in order to achieve different twisting and inclinations and thus greater robustness with respect to twisting and inclinations. In accordance with the invention, the scraper ring is supported in the axial direction at the groove by a third axial bearing, wherein two axial bearings are arranged at the same side of the scraper ring at separate raceways offset from one another in the axial direction of the rolling bearing. The axial bearings are given different lever support relationships by the axial offset of the raceways of the two axial bearings arranged at the same side of front side of the scraper ring, even though said axial bearings are arranged at the same scraper ring side, so that a better support can be achieved in the event of twisting and raceway inclinations and both axial bearings are never simultaneously subjected to canting or lifting in the same way.

The two axial bearings arranged at the same scraper ring front side can advantageously each have a width which is smaller than the width of the axial bearing arranged at the front side of the oppositely disposed scraper ring. If cylinder rolling bearings are used as axial bearings, the named width is the length of the cylindrical roller bodies and/or the width of the raceway of the bearing. An adaptation of the inclination from a deformation of the connection design is more easily possible by the use of two independent, relatively narrow raceways for the two axial bearings arranged at the same front side of the scraper ring. In addition, two such recessed, relatively narrow raceways in total provide a longer linear contact between the roller bodies and the raceways, in particular even when slight inclinations of the raceways occur due to deformations. In addition, narrow raceways also have to be produced with higher precision from a technical production aspect so that shape tolerances also occur less and have less importance.

The named axial offset of the two axial bearings arranged at the same front surface side can generally have a different magnitude or dimension. In order, on the one hand, to achieve a noticeable decoupling with respect to twisting and different support relationships, the offset amounts, in a further development of the invention, to at least 10% of the roller body diameter of the two named axial bearings. In order, on the other hand, to achieve a compact bearing geometry and scraper contour overall which does not thin out the scraper ring too much and keeps it stable, the named offset can amount to less than 200% of the named roller body diameter. If the two axial bearings arranged at the same front side of the scraper ring have different roller body diameters, the named offset dimensions advantageously relate to the larger roller body diameter.

The named axial offset of the two axial bearings arranged at the same front side of the scraper ring can advantageously amount to between 10% and 100%, preferably to approximately 15% to 35%, of the roller body diameter. The offset can in particular be selected such that, viewed in the radial direction, the two rolling bearings still cover one another with their roller bodies.

If the axial bearings arranged at oppositely disposed front sides of the scraper ring are looked at, the three axial bearings can advantageously have different raceway diameters, with, in an advantageous further development of the invention, at least one of the two axial bearings arranged at the same front side of the scraper ring not having any coverage with the axial bearing arranged at the other front side of the scraper ring when looking at the axial bearings in the axial direction. The named axial direction in this respect means the axis of rotation of the rolling bearing.

In an advantageous further development of the invention, provision can in this respect be made that one of the two axial bearings arranged at the same front side of the scraper ring covers the axial bearing arranged at the other front side of the scraper ring, viewed in the axial direction, whereas the other of the two axial bearings disposed at the same front side of the scraper ring does not have any coverage with the named axial bearing disposed at the other front side of the scraper ring.

In an alternative further development of the invention, the arrangement of the three axial bearings can also be made such that both of the axial bearings disposed at the same front side of the scraper ring have no coverage—viewed in the axial direction—with the axial bearing disposed at the other front side of the scraper ring, with provision in particular being able to be made that the axial bearing disposed at the named other front side of the scraper ring is arranged between the two axial bearings disposed at the same front side of the scraper ring, i.e. the roller bodies of the axial bearing disposed at the one front side of the scraper ring run on a raceway diameter which lies between the raceway diameter of the two other axial bearings disposed at a common front side of the scraper ring.

In the radial direction, the scraper ring is advantageously likewise supported at oppositely disposed sides of the scraper ring, with, in an advantageous further development of the invention, two radial bearings being able to be provided which can be arranged at oppositely disposed jacket surface sides of the named scraper ring.

The two radial bearings can in this respect be arranged, viewed in the axial direction, between the axial bearings arranged at oppositely disposed front sides of the scraper ring.

The arrangement of the radial bearings with respect to one another can generally differ in this respect. In an advantageous further development of the invention, the two radial bearings can cover one another, viewed in the radial direction, for example can be arranged in a common plane which is perpendicular to the axis of rotation.

The configuration of the named radial bearings can in this respect be different. In accordance with an advantageous embodiment of the invention, the two radial bearing can have roller bodies of different geometries, with one of the radial bearings in particular being able to be configured as a cylinder rolling bearing and the other radial bearing being able to be configured as a ball bearing. On the one hand, high radial forces can be transmitted with a compact radial construction due to the use of the cylinder rolling bearing, whereas, on the other hand, forces with axial components can also be carried off by the ball bearing which also has a support effect in directions inclined with respect to the radial direction.

In an alternative further development of the invention, however, both radial bearings can also have the same roller body type or the same geometrical type and can in particular both be configured as cylinder rolling bearings.

The invention will be explained in more detail in the following with respect to preferred embodiments and to associated Figs.

DETAILED DESCRIPTION

Figure 1:
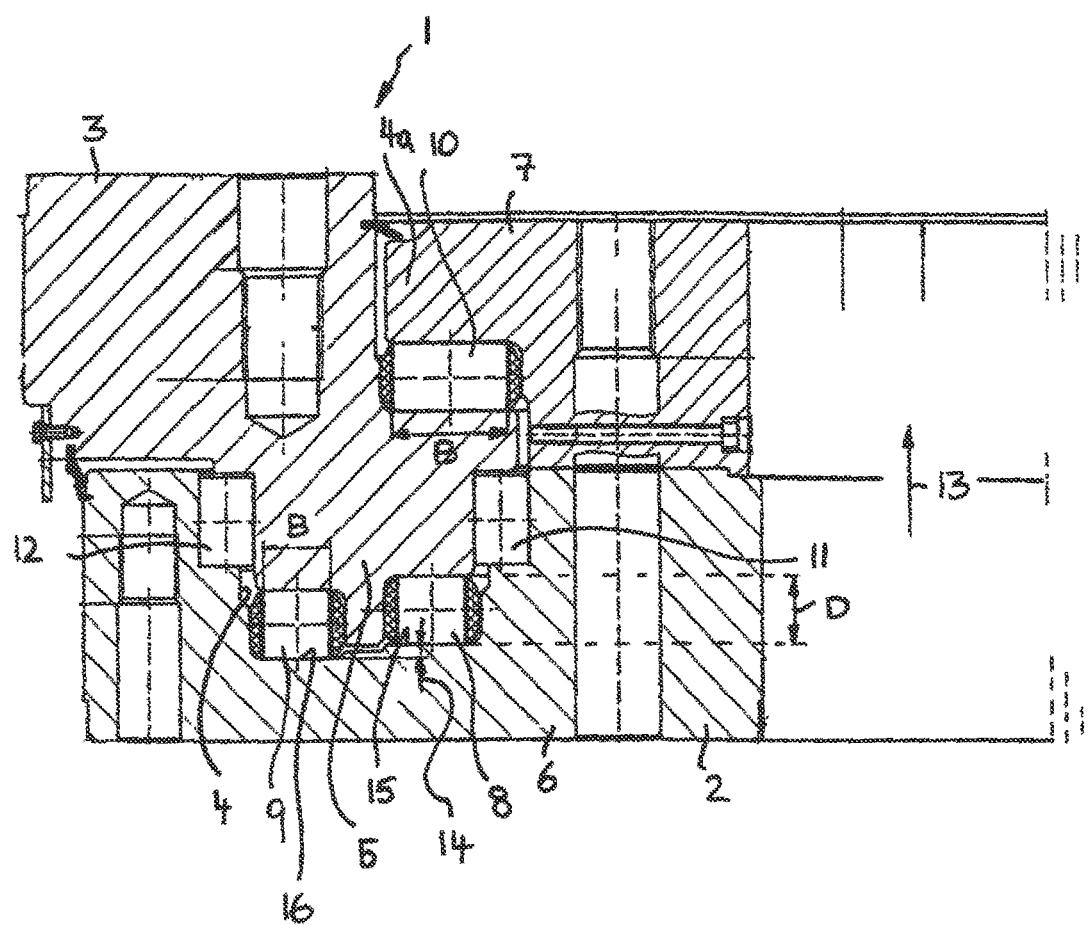
FIG. 1 shows a longitudinal half-section of a center-free large rolling bearing in accordance with an advantageous embodiment of the invention in accordance with which the two ball races are supported by three axial bearings in the form of cylinder roller bearings and by two radial bearings likewise in the form of cylinder rolling bearings.

As FIG. 1—and also the other Figures—show, the rolling bearing 1 can comprise two ball races 2 and 3 of which the one ball race 2 forms an inner race and the other ball race 3 forms an outer race. The named inner race 2 can have a smaller inner diameter than the outer race 3 and/or the outer race 3 can have a larger outer diameter than the named inner race 2.

The one ball race 2, preferably the inner race, can have a groove 4 open to the other ball race 3, preferably to the outer race, and the other ball race 3 can engage by a scraper ring 5 provided thereat into it while forming a gap or with a spacing at all sides. The named groove 4 can in this respect advantageously engage around the scraper ring 4 from four sides, and indeed at two oppositely disposed jacket surface sides and at two oppositely disposed front surface sides of the named scraper ring 5.

The named groove 4 can in this respect—in rough terms—comprise a U-shaped base contour in which the groove base is engaged around—at the right and at the left in accordance with FIG. 1—by two bearing race limbs. The named groove 4 can furthermore have a transversely projecting prolongation 4a at a side disposed opposite the groove base, said prolongation engaging around the scraper ring 5 at a side disposed opposite the groove base at the front side. The named groove 4 can be undercut overall. To be able to set the scraper ring 5 into the named groove 4, the ball race 2 having the groove 4 can be composed of a support race 6 and a holding race 7 which can be set thereon, cf. FIGS. 1, 2 and 3.

The named scraper ring 5 is supported with respect to the groove 4 by three axial bearings 8, 9 and 10 and by two radial bearings 11 and 12. In this respect, two of the named axial bearings 8 and 9 can be arranged at the same front side of the scraper ring—at the bottom in accordance with FIG. 1—and the third axial bearing 10 can be arranged at the oppositely disposed front side of the scraper ring. The radial bearings 11 and 12 can also be arranged at oppositely disposed sides, namely at oppositely disposed jacket surface sides of the named scraper ring 5 such that the scraper ring 5 is sandwiched or is supported both in that axial direction and in the radial direction between bearings located at oppositely disposed sides. The scraper ring 5 is supported at the groove 4 at all sides.

As FIG. 1 shows, the two axial bearings 8 and 9 provided at the same front side of the scraper ring are not only spaced apart from one another in the radial direction and at different raceways 15 and 16, but are also arranged offset from one another in the axial direction—i.e. in the direction of the arrow 13—such that the two axial bearings 8 and 9 are not at the same level.

The axial offset 14 can in this respect advantageously amount to approximately 15 to 35%, in particular to approximately 20%, of the diameter D of the roller bodies of the named axial bearings 8 and 9.

The axial bearings 8 and 9 arranged at the same front side of the scraper ring can in this respect have a width B—measured in the radial direction—which is respectively smaller than the width of the axial bearing 10 arranged at the oppositely disposed front side of the scraper ring, with the sum of the two widths of the two axial bearings 8 and 9 being able to correspond approximately to the width of the named other axial bearing 10.

The two axial bearings 8 and 9 can be positioned at the same front side of the scraper ring such that the one axial bearing 9 is covered, viewed in the axial direction, by the axial bearing 10 disposed at the oppositely disposed front side of the scraper ring, whereas the other axial bearing 8 does not show any such coverage.

The two radial bearings 11 and 12 can be arranged disposed opposite one another. Independently of this, it can be advantageous for the two radial bearings 11 and 12 to be arranged between the axial bearings 8, 9 and 10, cf. FIG. 1.

As FIG. 1 shows, both the axial bearings 8, 9 and 10 and the radial bearings 11 and 12 can each be configured as cylinder rolling bearings.

Figure 2:
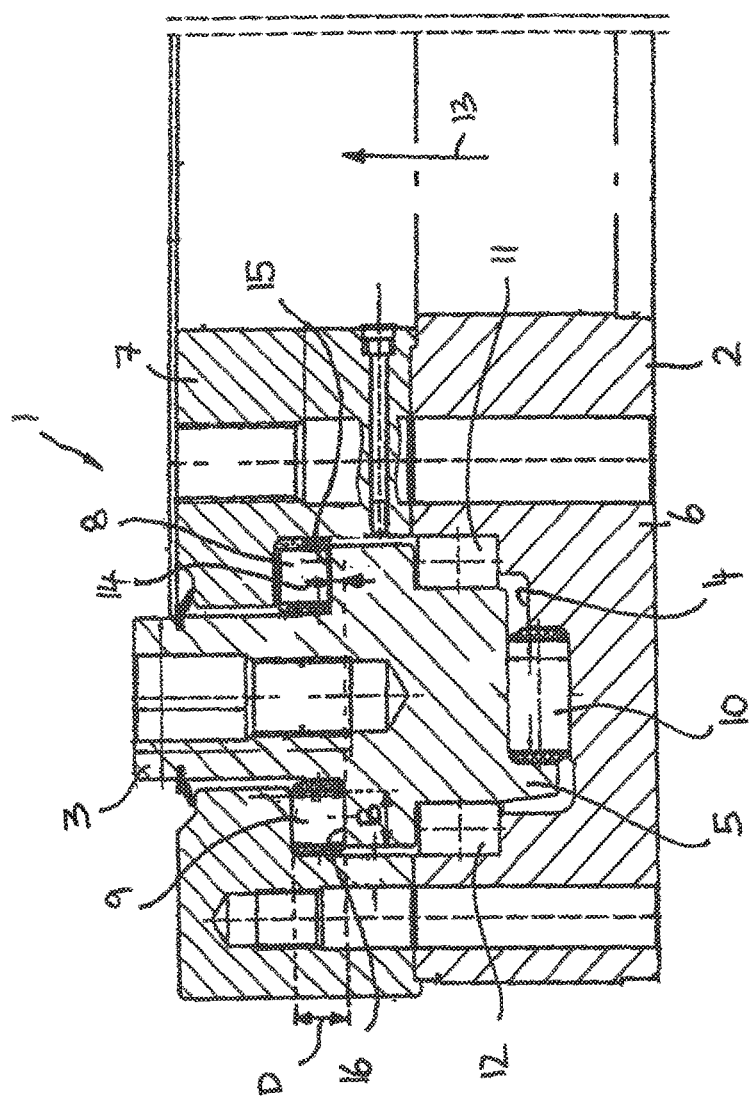
FIG. 2 shows a longitudinal half-section through a center-free large rolling bearing in accordance with a further advantageous embodiment of the invention in which the two ball races are likewise supported by three axial bearings in the form of cylinder rolling bearings and by two radial bearings in the form of cylinder rolling bearings.

The rolling bearing shown in FIG. 2 corresponds to the embodiment in accordance with FIG. 1 with respect to a number of feature complexes, in particular with respect to the arrangement of the radial bearings 11 and 12 and substantially differs from the embodiment of FIG. 1 by the arrangement of the axial bearings. In FIG. 2, the axial bearings 8 and 9 arranged at the same front side of the scraper ring are also offset with respect to one another in the axial direction. However, the arrangement of these two axial bearings 8 and 9 is made in this respect such they are not covered by the axial bearing 10, viewed in the axial direction, at the oppositely disposed front side of the scraper ring. The named axial bearing 10 disposed on the oppositely disposed front side of the scraper ring is arranged, viewed in the axial direction, between the two axial bearings 8 and 9 disposed at the same front side of the scraper ring.

Furthermore, as FIG. 2 shows, provision can be made that the two axial bearings 8 and 9 disposed at the same front side are supported at the holding race 7, whereas the third axial bearing 10 is supported at the oppositely disposed front side of the scraper ring at the support race 6. Independently of this, the two axial bearings 8 and 9 disposed at the same front side of the scraper ring can be supported at oppositely disposed jacket surface sides of the ball race 3, in particular at corresponding steps in the contour at the jacket surface side.

To the extent that the embodiment in accordance with FIG. 2 corresponds to the embodiment in accordance with FIG. 1, reference can be made to the preceding description.

Figure 3:
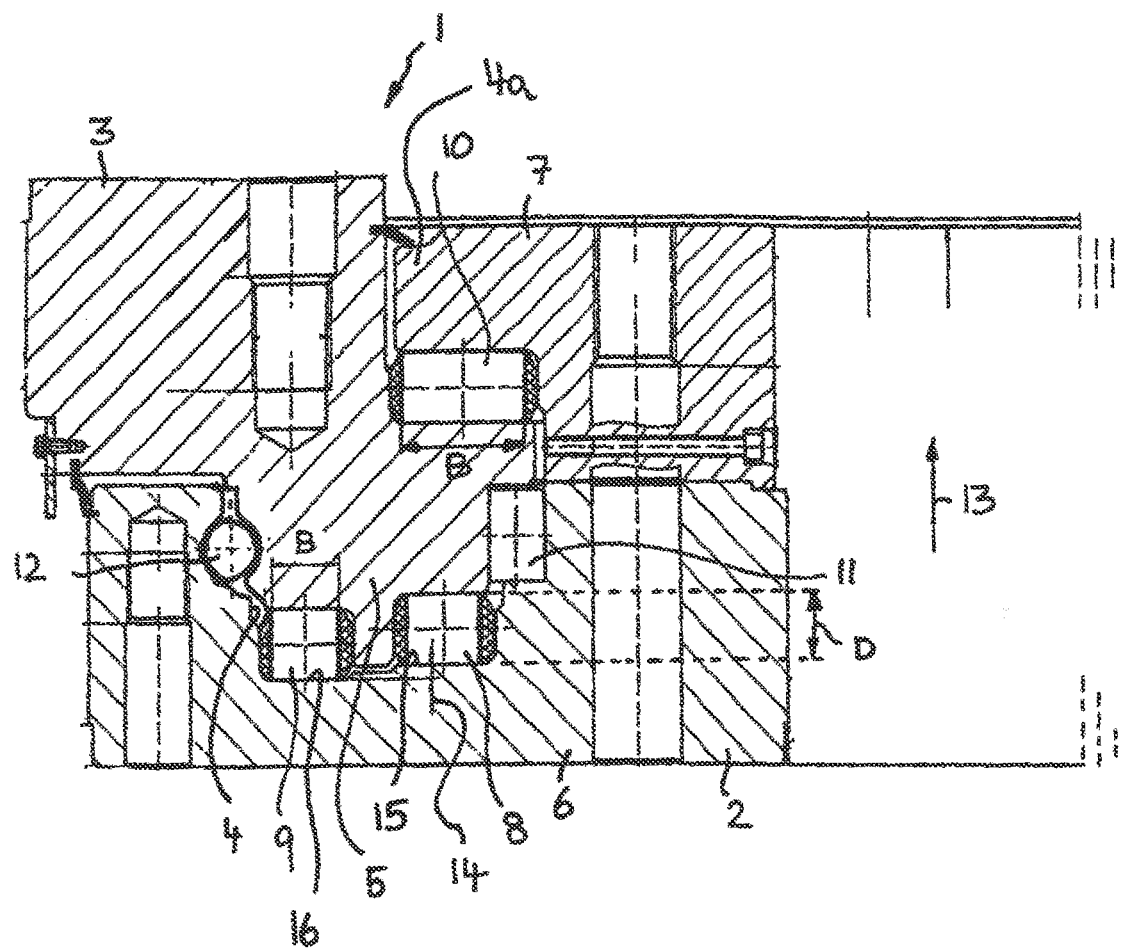
FIG. 3 shows a longitudinal half-section through a center-free large rolling bearing in accordance with a further advantageous embodiment of the invention in which the two ball races are supported with respect to one another, in a similar manner to the embodiment of FIG. 1, by three axial bearings in the form of cylinder rolling bearings and by two radial bearings, with the one of the radial bearings being configured as a cylinder rolling bearing and the other radial bearing being configured as a ball bearing.

As FIG. 3 shows, different rolling body types can also advantageously be used. The two radial bearings 11 and 12 can in particular have different roller body geometries, with one of the radial bearings 11 in particular being able to be configured as a cylinder rolling bearing and the other radial bearing 12 as a ball bearing. The arrangement can in this respect advantageously be made such that the radial cylinder rolling bearing is arranged at the inner side and the radial ball bearing is arranged at the outer side of the scraper ring 5, cf. FIG. 3.

To the extent that the embodiment in accordance with FIG. 3 likewise corresponds to the embodiment in accordance with FIG. 1, reference can likewise be made to the previous description. Furthermore, the named radial bearing design can also be implemented with different roller body geometries, but also in a rolling bearing arrangement in accordance with FIG. 2 so that reference can in this respect also be made to the previous description.

The invention claimed is:

1. A rolling bearing having two concentric ball races, wherein a first ball race comprises a groove open toward a second ball race and the second ball race comprises a scraper ring engaging into the groove, wherein the scraper ring is supported at the groove in an axial direction of the rolling bearing by a first and a second axial bearing transversely arranged at oppositely disposed ends of a front side of the scraper ring and is supported in a radial direction of the rolling bearing by at least one radial bearing, wherein the scraper ring is supported at the groove in the axial direction by a third axial bearing arranged at an oppositely disposed front side of the scraper ring and positioned offset between the first and second axial bearings arranged at the front side of the scraper ring in two raceways offset from one another in the axial direction and without coverage of the third axial bearing.

2. The rolling bearing in accordance with claim 1, wherein an axial offset of the two raceways of the first and second axial bearings arranged at the front side of the scraper ring amounts to between 10% and 200% of a roller body diameter of the first and second axial bearings.

3. The rolling bearing in accordance with claim 2, wherein the axial offset of the two raceways is between 10% to 100%.

4. The rolling bearing in accordance with claim 2, wherein the axial offset of the two raceways is between 15% to 35%.

5. The rolling bearing in accordance with claim 1, wherein the first and second axial bearings arranged axially offset at the front side of the scraper ring each have a width which is smaller than a width of the third axial bearing arranged at the oppositely disposed front side of the scraper ring.

6. The rolling bearing in accordance with claim 1, wherein a sum of widths of the first and second axial bearings disposed at the front side of the scraper ring approximately corresponds to a width of the third axial bearing seated at the oppositely disposed front side of the scraper ring.

7. The rolling bearing in accordance with claim 1, wherein the scraper ring is supported in the radial direction at the groove by two radial bearings arranged at oppositely disposed jacket surface sides of the scraper ring.

8. The rolling bearing in accordance claim 7, wherein the two radial bearings are arranged, viewed in the radial direction, between the axial bearings arranged at the oppositely disposed front side of the scraper ring.

9. The rolling bearing in accordance with claim 7, wherein the two radial bearings cover one another, viewed in the radial direction, and are arranged in a common plane which is perpendicular to an axis of rotation of the rolling bearing.

10. The rolling bearing in accordance with claim 1, wherein the scraper ring is supported at the groove by exactly two radial bearings and by exactly three axial bearings; and/or the first and second ball races are supported with respect to one another by exactly two radial bearings arranged at oppositely disposed sides and by exactly three axial bearings arranged at oppositely disposed sides; wherein the exactly three axial bearings are comprised of the first, second, and third axial bearings.

11. The rolling bearing in accordance with claim 1, wherein the rolling bearing is a center-free large rolling bearing.

* * * * *